Aug. 1, 1972  J. MERCIER  3,681,204
PROCESS FOR CONTINUOUS PURIFICATION OF ESTERS BY PLURAL
DISTILLATION AT SPECIFIC PRESSURE RANGES
Filed June 11, 1969
Fig.1
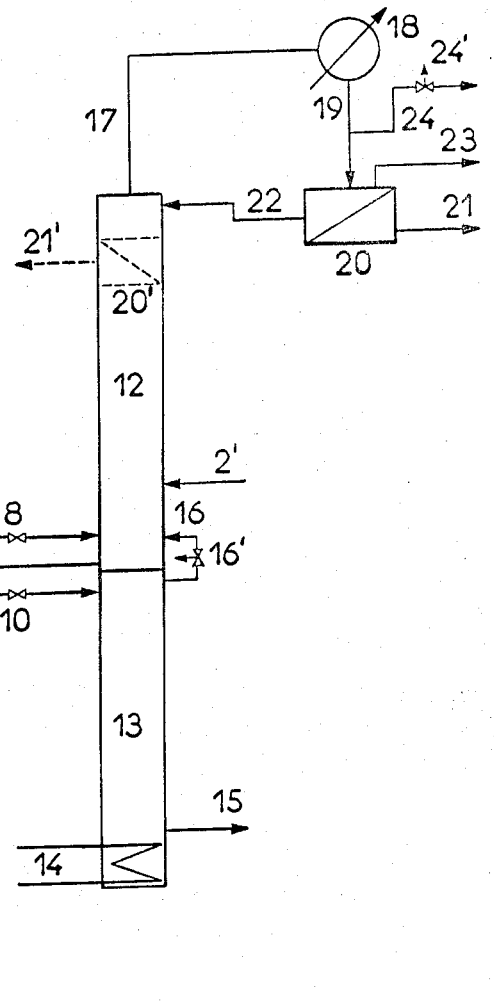
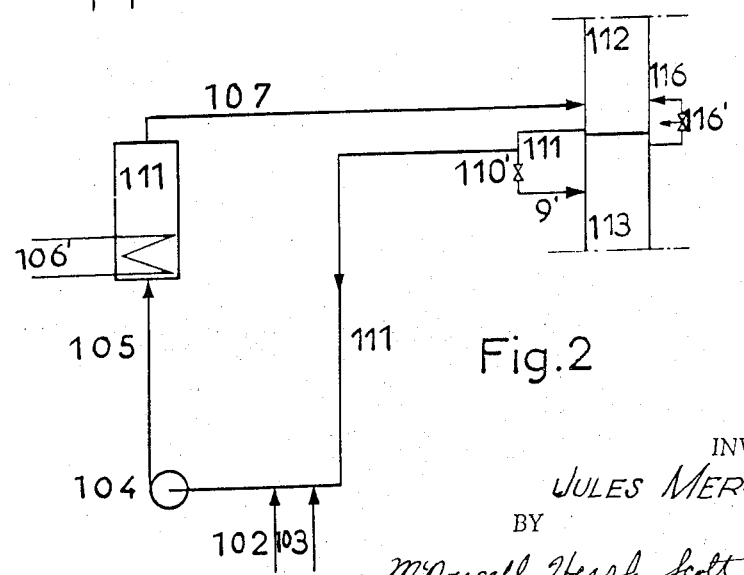
Fig.2
INVENTOR.
JULES MERCIER
BY
McDougall, Hersh, Scott & Ladd ATTYS.

3,681,204
PROCESS FOR CONTINUOUS PURIFICATION OF ESTERS BY PLURAL DISTILLATION AT SPECIFIC PRESSURE RANGES
Jules Mercier, Melle, Deux-Sevres, France, assignor to Melle-Bezons, Melle, Deux-Sevres, France
Filed June 11, 1969, Ser. No. 832,074
Claims priority, application France, June 12, 1968, 487
Int. Cl. B01d *3/36;* C07c *67/06*
U.S. Cl. 203—77                                   11 Claims

ABSTRACT OF THE DISCLOSURE

A process for the continuous production of esters in which raw reactor effluent is fed to two distillation zones, one of the zones being an ester separation zone and the other zone being a dehydration zone, wherein the improvement comprises operating the ester separation zone at a pressure in excess of atmospheric pressure and operating the dehydration zone at a pressure which does not exceed atmospheric pressure.

---

The present invention relates to a process for the continuous manufacture of esters.

In U.S. Pat. No. 3,404,175, there is disclosed a process for the continuous production of esters which have a boiling point above that of the parent alcohol or acid. This process generally comprises continuously introducing the raw reactor effluent containing alcohol, acid, ester and water into the middle portion of a distillation column, subdivided into two separate upper and lower sections. The lower section serves to completely separate the esters, and the upper section serves to dehydrate the mixture.

The ester separation section is heated at the base, and vapors issuing from the top are introduced into the base of the dehydration section. At least a portion of the tail liquid from the dehydration section, containing excess alcohol and acid, is returned or recycled to the reactor. Introduced to the head of the ester separation section is a liquid whose composition corresponds approximately to that of the tail liquid of the dehydration section, and which may be obtained from a zone in the apparatus having the desired composition.

The ester is withdrawn from the base or bottom of the ester separation section, and water is withdrawn from the top of the dehydration section, after decantation of an aqueous heterogeneous azeotrope which is formed in the dehydration section. Formation of the azeotropic mixture may be promoted by the use of an auxiliary liquid which is insoluble in water and is readily separable from the alcohol and the ester. The auxiliary liquid may be, for example, a hydrocarbon or a comparatively volatile ester formed in situ by the introduction into the column or the reactor of a small amount of an acid or alcohol which is more volatile than the parent alcohol or acid of the ester being produced.

It is an object of the present invention to modify the prior process in a manner to provide improvements in the operation and efficiency thereof.

It has been found that in the production of certain esters, and particularly methoxy ethyl acetate, ethoxy ethyl acetate, methoxy ethyl propionate, n-amyl acetate and n-butyl acetate, the separation of the acid-ester binary azeotropic mixture governs the operation of the ester separation section. In order that this separation take place completely and under the most economical conditions, it is desirable to carry out the ester separation at a pressure greater than atmospheric pressure, as measured at the top of the ester separation section. It has been found that an increase in operating pressure in this section has a most favorable effect, and that the separation of the acid ester binary mixture becomes more efficient with higher pressure.

If, however, the operating pressure is raised throughout the process, higher temperatures must be used in the reactor, thereby causing undesirable formation of alcohols and glycols through splitting of the alkoxy group of the alkoxy alcohols, along with subsequent undesirable formation of corresponding esters.

According to the present invention, the process essentially comprises operating the ester separating section under a pressure, as measured at the top of the section, which is greater than atmospheric pressure, and the dehydration section under a pressure, measured at the top of the dehydration section, less than atmospheric. While operated under different pressures, these two sections of the column may still be operated with only one heat supply. Thus the heat supply at the base of the ester separation section may be used to operate the ester separation section as well as the dehydration section.

The pressure in the ester separation section, as measured at the top of this section, is above the pressure prevailing in the base portion of the dehydration section and is within the range of above one atmosphere to an absolute pressure of 3500 m. of mercury. The pressure in the dehydration section, as measured at the top, falls within the range of 100 to 760 mm. of mercury. In industrial application, the pressure utilized in the ester separation section is limited by the amount of heat exchange taking place in the reboiler in the base portion of the ester separation section. The pressure to be used also depends upon the stability of the desired ester at higher temperatures.

To render the apparatus of the aforementioned patent suitable for carrying out the process for the present invention, it is sufficient to provide a conventional vapor release valve in the line through which the head vapors of the ester separation section are sent to the base portion of the dehydration section, and a control device for the pressure at the top of the dehydration section.

For purposes of illustration, but not of limitation, reference is made to the following drawing for a better understanding of the invention:

FIG. 1 is a schematic drawing of the apparatus suitable for carrying out one embodiment of the invention; and FIG. 2 is a partial schematic diagram of the apparatus suitable for carrying out another embodiment of the present invention.

In the apparatus depicted in FIG. 1, there is provided a reactor circuit or system generally comprising reactor 1, a line or pipe 7 from the reactor to a distillation column having sections 12 and 13, line 11 leading from the bottom or base portion of section 12 to pump 4, heater 6 and line 5 which leads back to reactor 1. While the column comprising section 12, the dehydration section, and section 13, the ester separation section, is depicted in the drawing as being a single column with the two section being superposed, it is apparent that two separate columns may likewise be employed.

The reaction takes place in reactor 1 which contains a solid catalyst which is insoluble in the reaction medium or mixture. The catalyst is preferably an ion exchange resin. The alcohol may be introduced at any point in the reaction circuit described above, for example, through line 2 upstream of pump 4.

If the starting alcohol contains water, it is advisable to introduce it by line 2' into section 12 in which the water separation or dehydration operation takes place. In this way the water-containing alcohol passes through section 12 of the column, and is dehydrated.

The reactant acid is introduced either by line 3 as shown in the drawing, or, if it contains water, into section 12 of the column through line 2′ together with the alcohol. The acid and alcohol, both in concentrated form, leave the column through line 11 and are fed to the reactor. The reactant mixture is fed by pump 4 to reactor 1 through line 5 which may be heated by heat exchanger 6. The reaction mixture, generally a liquid, issuing from reactor 1 through line 7 is fed in part through valve 8 to the base portion of dehydration section 12 of the column, and in part through line 9 and valve 10 to the top portion of ester separation section 13. Heated by heating device 14, the ester is rapidly concentrated in the lower portion of the ester separation section 13 and is withdrawn therefrom in purified form through line 15. The vaporous effluent from the top of the ester separation section is passed through line 16 to the base of dehydration section 12, from which the excess alcohol and unconverted acid may be recycled by way of line 11 to reactor 1 after removal of water. Since section 13 is operated under superatmospheric pressures and section 12 is operated under subatmospheric pressures, line 16 leading from the ester separation section to the dehydration section is provided with a relief valve 16′ so that the pressures in the respective sections will be maintained.

The separation of all water in the system, water produced in the esterification reaction as well as any water which may have been present in the alcohol and/or acid feeds, takes place in the upper portion of dehydration section 12 of the column, where the water is entrained as an aqueous heterogeneous azeotropic mixture. The upper portion of section 12 is provided with the necessary means to separate the heterogeneous layers produced after condensation of the azeotropic mixture. The upper portion of column 12 is provided with a condenser 18 and a decanter 20. The head vapors leaving section 12 pass through line 17 and are liquefied in condenser 18. The condensate from condenser 18 passes through line 19 to decanter 20.

To line 19 there is connected a line 24 which opens either to the atmosphere or to a vacuum pump and is provided, if necessary, with a control valve 24′. This valve serves to control the absolute pressure in the dehydration section.

The aqueous layer formed in decanter 20 is drawn off through line 21. If this layer contains dissolved alcohol, the alcohol may be recovered by treatment of the layer in a conventional distillation column (not illustrated in the drawing). The organic layer in decanter 20 is returned from the upper portion of section 12 by way of line 22 as reflux.

As one variation of this embodiment, the decanter may be physically located within the upper portion of section 12 and is depicted as 20′ in the figure in this variation. The water is withdrawn through line 21′. If desired, both decanters 20 and 20′ may be used simultaneously. In this event, the water is drawn off through line 21′ and a portion of the upper or organic layer from decanter 20 is withdrawn through line 23 so as to remove small amounts of low boiling impurities which may be formed during the reaction or otherwise be present in the initial feed.

The apparatus depicted in FIG. 2 is devised for using a liquid non-volatile catalyst such as sulfuric acid. In this embodiment the difference in the apparatus resides only in the arrangement of the reaction circuit, and hence only that portion of the apparatus has been shown in FIG. 2.

Reactor 101 is a vessel heated by heater 106 and is maintained at the boiling temperature of the liquid mixture contained therein. The reaction products are introduced as vapors through line 107 into the base portion of dehydration section 112. The top of the ester separation section 113 is fed with liquid from the base of section 112 by line 109′ connected to line 111, the feed rate being controlled by valve 110′. The remainder of the liquid in line 111 is recycled to the reactor 101 by way of line 105.

By means of the process of the present invention, it is possible to obtain simultaneously pure water from the top of dehydration section, free from alcohol, acid and ester contaminates, and ester from the bottom of the ester separation section, free of acid, alcohol and water. Unconverted acid and alcohol are in essence driven back down to the bottom of the dehydration section, from which they are withdrawn and recycled. Thus, the reaction is completed within the reactor and distillation column in terms of the effluents of the overall system, i.e., ester and water in stoichiometric amounts.

The water is removed at the top of the distillation column after decantation of the heterogeneous azeotropic mixture which is formed from the alcohol and water, the ester and water, or the alcohol, ester and water, when the organic constituents such as the alcohol and ester, are insoluble in the aqueous layer in the decanter. If the alcohol and/or ester are capable of forming a heterogeneous azeotropic mixture, one or two of the components of which is or are partially water-miscible, then it is preferable to form an auxiliary heterogeneous azeotropic mixture. This may be done by introducing an auxiliary liquid into the upper portion of the distillation column as explained above. It has been found that aliphatic and aromatic hydrocarbons having six to twelve carbon atoms are suitable for this purpose. It is also possible to use as the auxiliary liquid a by-product of the esterification reaction. For example, it is possible to add to the reactor a small amount of an acid or alcohol which is more volatile than the parent acid or alcohol of the ester being produced to form a more volatile ester which can be separated in the dehydration section. In such cases, it is not inconvenient if the auxiliary reactants are partially water-miscible.

It has been found that the process of the present invention is generally applicable to the production of esters having the following formula

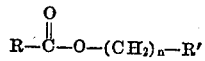

wherein

R is a lower alkyl; such as methyl, ethyl, propyl, butyl and the like having from 1–6 carbon atoms;

R′ is hydrogen, lower alkyl or lower alkoxy; such as methoxy, ethoxy, butoxy and the like having from 1–6 carbon atoms;

and $n$ is an integer from 1 to 3

By means of the present invention, the desired ester may be obtained in pure form without any remaining trace of the catalyst.

The following nonlimiting examples clearly; illustrate the advantages of the process of the present invention.

EXAMPLE I

This example relates to the producting of methoxy ethyl acetate.

The reaction circuit of the apparatus shown in FIG. 1 is fed through line 2 with 191 kg. per hour of 2-methoxy ethanol, and through line 3 with 124 kg. per hour of acetic acid. The flow rate through the reaction circuit, controlled by means of valve 8, is 7,000 liters per hour. In reactor 1, which is of the conical type described in U.S. Pat. No. 2,980,731, there is dispersed and suspended, in the liquid flow, 2,000 liters of a polystyrene sulfonic-type ion exchange resin. The composition by weight of the reaction mixture issuing from the reactor at a temperature of 110° C. is:

| | Percent |
|---|---|
| Methoxy ethyl acetate | 55 |
| Methoxy ethanol | 35 |
| Acetic acid | 6 |
| Water | 4 |

Ester separation section 13 is fed through line 9 with 2200 kg. per hour of reactor effluent with the remainder being fed to dehydration section 12, through line 8.

200 kgs. of benzene is fed to the upper portion of the dehydration section 12 to produce an auxiliary heterogeneous azeotropic mixture therein.

Under these conditions, if a release valve 16' is not utilized in line 16, a pressure of 300 mm. of mercury in the upper portion will produce a pressure of 500 mm. of mercury in the upper portion of section 13, and the output of the process will be 240 kgs. of methoxy ethyl acetate of poor quality, containing 0.3% by weight of acetic acid and 36.5 kgs. of water.

The heat requirement of heat exchanger 14 is 1400 kilocalories per kilogram of ester withdrawn.

All other variables being the same, if the operation is carried out with an ester output four times less, the ester withdrawn through line 15 still contains 0.06% by weight of acetic acid and the heat requirement amounts to 5600 kilocalories per kilogram of ester withdrawn.

If, with the same operating conditions, the operation is carried out in accordance with the present invention by maintaining by means of valve 16' a pressure of 1150 mm. of mercury in the top portion of ester separation section 13, there is obtained 240 kgs. of ester per hour of high quality, containing only 0.008% by weight of acetic acid. The heat requirement is only 1500 kilocalories per kilogram of ester withdrawn.

If, with the same operating conditions, the top portion of section 12 is maintained at an absolute pressure of 900 mm. of mercury while an absolute pressure of 1150 mm. of mercury is maintained at the top portion of section 13, thereis is obtained through line 15 only 230 kg. per hour of methoxy ethyl acetate, the remainder of the withdrawn product consisting of 9 kg. of a mixture of ethylene glycol and ethylene glycol mono-acetate and di-acetate.

The above, comparative experiments plainly show that the best results are obtained when the operation is carried out in accordance with the present invention.

EXAMPLE II

This example illustrates the manufacture of ethoxy ethyl acetate in the apparatus of Example I.

The reaction circuit is fed with 427 kg. of 2-ethoxy ethanol through line 2 and 285 kg. of acetic acid through line 3. The flow rate through the circuit is maintained at 7000 liters per hour. Reactor 1 contains, in dispersed and suspended state, the same amount of the same catalyst as in Example I.

The composition by weight of the reaction mixture issuing from the reactor at a temperature of 115° C. is as follows:

| | Percent |
|---|---|
| Ethoxy ethyl acetate | 60 |
| Ethoxy ethanol | 20 |
| Acetic acid | 16 |
| Water | 4 |

Section 13 is fed with 2200 kg. per hour of reaction mixture, the remainder entering section 12. The upper portion of section 12 is fed with benzene as in Example I.

Under such conditions, if both sections 12 and 13 are operated under reduced pressure, by not using valve 16' and by applying to the top portion of section 12 an absolute pressure of 500 mm. of mercury, thus giving rise to an absolute pressure of 650 mm. of mercury in the top portion of section 13, the ethoxy ethyl acetate production amounts to 620 kg. per hour with a heat requirement in heat exchanger 14 of 430 kilocalories per kg. of ester withdrawn.

If, in accordance with the present invention, there is applied to the top portion of section 13, by means of valve 16', an absolute pressure of 850 mm. of mercury, it is possible, without modifying the composition of the reaction mixture withdrawn from the reactor, to increase the amount of starting reactants to such an extent that the production increases from 620 kg. per hour to 850 kg. per hour, while the heat requirement decreases to 350 kilocalories per kg. of ester withdrawn.

This example also shows the improvement resulting from the process of the invention.

It will be understood that various changes and modifications may be made in the details of the invention and the apparatus without departing from the true scope of the invention, especially as defined in the following claims.

I claim:

1. In a continuous process for the manufacture of esters having the formula

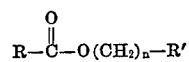

wherein R is an alkyl group containing 1 to 6 carbon atoms, R' is selected from the group consisting of hydrogen, alkyl containing 1 to 6 carbon atoms and alkoxy containing 1 to 6 carbon atoms, and $n$ is an integer from 1 to 3, said esters having a boiling point above that of the parent alcohol or acid, in which a raw reaction mixture from an esterification reaction zone which contains alcohol, acid, ester and water is continuously fed to the middle portion of a distillation zone divided into an ester separation zone heated at its base and a dehydration zone, with the vapors issuing from the top of the ester separation zone being fed to the base of the dehydration zone and the ester being withdrawn from the ester separation zone in purified form, the improvement comprising operating the ester separation zone at a pressure within the range above 1 atmosphere up to 3500 mm. of Hg and operating the dehydration zone at a pressure within the range of 100 to 760 mm. of Hg, both pressures being measured at the top of the respective zones, with the pressure at the top of the ester separation zone being maintained at a level greater than the pressure at the bottom of the dehydration zone.

2. The process as defined in claim 1 wherein reaction mixture is fed to the base of said dehydration zone.

3. The process as defined in claim 2 wherein said reaction mixture is also fed to the top of said ester separation zone.

4. The process as defined in claim 1 wherein the reaction zone contains a solid catalyst which is insoluble in the reaction medium.

5. The process as defined in claim 4 wherein said catalyst is suspended in a fluid state in and by the reaction mixture passing through said reaction zone.

6. The process as defined in claim 1 wherein said dehydration zone contains a water-insoluble auxiliary liquid which is readily separable from the alcohol reactant and ester product and which promotes the formation of a heterogeneous azeotrope.

7. The process as defined in claim 6 wherein said auxiliary is a hydrocarbon.

8. The process as defined in claim 7 wherein said hydrocarbon is benzene.

9. The process as defined in claim 6 wherein said auxiliary liquid is a second ester more volatile than the ester being produced.

10. The process as defined in claim 9 wherein said second ester is produced in the reaction zone by the introduction of a material selected from the group consisting of an acid more volatile than the acid reactant and an alcohol more volatile than the alcohol reactant.

11. The process as defined in claim 6 wherein the pressure in said ester separation zone is from about 800 to 3500 mm. of mercury.

(References on following page)

References Cited

UNITED STATES PATENTS

| | | | |
|---|---|---|---|
| 2,049,486 | 8/1936 | Babcock | 203—77 |
| 2,409,773 | 10/1946 | Luten et al. | 203—74 |
| 2,650,249 | 8/1953 | Mention et al. | 260—499 |
| 2,787,636 | 4/1957 | Alheritiere et al. | 260—499 |
| 2,936,321 | 5/1960 | Mercier | 260—499 |
| 2,998,357 | 8/1961 | Gillette et al. | 203—77 |
| 3,057,727 | 9/1962 | Vonkessel et al. | 203—77 |
| 3,329,586 | 7/1967 | Pettengill | 203—80 |
| 3,404,175 | 10/1968 | Mercier | 203—14 |
| 3,431,181 | 4/1969 | Bouniot | 260—499 |
| 3,513,078 | 5/1970 | Bearnais et al. | 260—499 |

OTHER REFERENCES

Horsley: Azeotropic Data, published by American Chemical Society Wash., D.C., 1952, pp. 318–322 relied on.

WILBUR L. BASCOMB Jr., Primary Examiner

U.S. Cl. X.R.

203—14, 60, 69; 260—488, 499

UNITED STATES PATENT OFFICE

CERTIFICATE OF CORRECTION

Patent No. 3,681,204            Dated August 1, 1972

Jules MERCIER

It is certified that errors appear in the above identified patent and that said Letters Patent are hereby corrected as shown below:

Column 1, line 33, change "esters" to read -- ester --

Column 5, line 9, after "portion" please insert -- of section 12 --

Signed and sealed this 6th day of March 1973.

(SEAL)
Attest:

EDWARD M. FLETCHER, JR.
Attesting Officer

ROBERT GOTTSCHALK
Commissioner of Patents